US012800758B2

(12) United States Patent
Li

(10) Patent No.: US 12,800,758 B2
(45) Date of Patent: Nov. 17, 2026

(54) PHOTOELECTRIC SCANNING APPARATUS, MOTOR, AND AUTONOMOUS VEHICLE

(71) Applicant: Yinwang Intelligent Technologies Co., Ltd., Shenzhen (CN)

(72) Inventor: Minggui Li, Wuhan (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 1083 days.

(21) Appl. No.: 17/950,622

(22) Filed: Sep. 22, 2022

(65) Prior Publication Data

US 2023/0016536 A1 Jan. 19, 2023

Related U.S. Application Data

(63) Continuation of application No. PCT/CN2020/080746, filed on Mar. 23, 2020.

(51) Int. Cl.
*G01S 13/00* (2006.01)
*G01S 7/481* (2006.01)
*G01S 13/931* (2020.01)

(52) U.S. Cl.
CPC .......... *G01S 13/931* (2013.01); *G01S 7/4817* (2013.01); *G01S 2013/93273* (2020.01)

(58) Field of Classification Search
CPC ......... G01S 7/4817; G01S 2013/93273; G01S 13/931
See application file for complete search history.

(56) References Cited

U.S. PATENT DOCUMENTS 11,112,492 B2 * 9/2021 Utermoehlen ....... G01D 5/2053
11,796,827 B1 * 10/2023 Earhart .................. G01S 7/487
(Continued)

FOREIGN PATENT DOCUMENTS

CN 105785383 A 7/2016
CN 105785384 A 7/2016
(Continued)

OTHER PUBLICATIONS

Extended European Search Report in European Appln No. 20928008.0, dated Jan. 24, 2023, 7 pages.
(Continued)

*Primary Examiner* — Gerald J Sufleta, II
(74) *Attorney, Agent, or Firm* — Fish & Richardson P.C.

(57) ABSTRACT

Embodiments of this application provide example photoelectric scanning apparatuses, motors, and autonomous vehicles. One example photoelectric scanning apparatus includes a motor, a wireless transmission assembly, and an environment detection apparatus. The motor includes a stator, a rotor, and a base, the stator is fixedly mounted on the base, and the rotor is sleeved on the stator. The wireless transmission assembly includes a first coil and a second coil, the first coil and the environment detection apparatus are both mounted on the rotor, the first coil is electrically connected to the environment detection apparatus, the second coil is mounted on the base, and the second coil is electrically connected to a control host. At least one of wireless signal transmission or wireless power transmission is implemented between the control host and the environment detection apparatus through magnetic coupling between the first coil and the second coil.

19 Claims, 11 Drawing Sheets

(56) References Cited

U.S. PATENT DOCUMENTS

| | | | | |
|---|---|---|---|---|
| 12,081,380 | B2 * | 9/2024 | Lim | H04L 5/005 |
| 2009/0052288 | A1 | 2/2009 | Eno et al. | |
| 2020/0018829 | A1 | 1/2020 | Xiang et al. | |
| 2021/0210270 | A1 * | 7/2021 | Chykeyuk | H01F 38/18 |

FOREIGN PATENT DOCUMENTS

| | | | |
|---|---|---|---|
| CN | 106249248 | A | 12/2016 |
| CN | 206411271 | U | 8/2017 |
| CN | 108828610 | A | 11/2018 |
| CN | 208241412 | U | 12/2018 |
| CN | 106712394 | B | 4/2019 |

OTHER PUBLICATIONS

International Search Report and Written Opinion in International Appln. No. PCT/CN2020/080746, mailed on Nov. 25, 2020, 17 pages (with English translation).

Extended European Search Report in European Appln. No. 25213164.4, mailed on Apr. 30, 2026, 7 pages.

* cited by examiner

PHOTOELECTRIC SCANNING APPARATUS, MOTOR, AND AUTONOMOUS VEHICLE

CROSS-REFERENCE TO RELATED APPLICATIONS

This application is a continuation of International Application No. PCT/CN2020/080746, filed on Mar. 23, 2020, the disclosure of which is hereby incorporated by reference in its entirety.

TECHNICAL FIELD

This application relates to the field of photoelectric scanning device technologies, and in particular, to a photoelectric scanning apparatus, a motor, and an autonomous vehicle.

BACKGROUND

When an autonomous vehicle autonomously travels, the autonomous vehicle usually detects and identifies an ambient environment by using a photoelectric scanning apparatus mounted on the vehicle, and then makes a behavior decision based on obtained environment information.

In a related technology, the photoelectric scanning apparatus usually includes a radar and a motor, and the motor is usually a separable motor. As shown in FIG. 1, the motor includes a stator (not shown in the figure), a rotor (not shown in the figure), a fixed shaft 300, and a rotating body 200. The rotating body 200 may be rotatably sleeved on an outer side of the fixed shaft 300. The stator is mounted on the fixed shaft 300, and the rotor is mounted on the rotating body 200. The radar is mounted on one end of the rotating body 200, and is rotated with the rotating body to expand an identification range of the radar. Both a power signal and a control signal that are required when the radar operates are transmitted in a wireless manner. For example, the power signal is transmitted to the radar through a power transmission assembly disposed at one end of the motor, and the control signal is transmitted to the radar through a signal transmission assembly disposed at the other end of the motor. The power transmission assembly includes a power transmission inner ring 121 and a power transmission outer ring 122. The signal transmission assembly includes a signal inner ring 131 and a signal outer ring 132. The power transmission inner ring 121 is mounted on the fixed shaft 300 by using a first attachment plate 400. The power transmission outer ring 122 is mounted on the rotating body 200 by using a second attachment plate 500. The power transmission inner ring 121 implements wireless power transmission to the power transmission outer ring 122 through magnetic coupling. The signal inner ring 131 is sleeved on the fixed shaft 300, and the signal outer ring 132 is mounted on the rotating body 200 and sleeved on an outer side of the signal inner ring 131. The signal inner ring 131 implements wireless signal transmission to the signal outer ring 132 through magnetic coupling.

However, the foregoing photoelectric scanning apparatus includes a large quantity of components, resulting in a complex structure. In addition, an assembly process of the foregoing photoelectric scanning apparatus is complex, and a plurality of times of assembly are required. As a result, an accumulated tolerance in assembly is high, and further, a failure probability of coupling of the power transmission assembly and/or a failure probability of coupling of the signal transmission assembly are/is high.

SUMMARY

Embodiments of this application provide a photoelectric scanning apparatus, a motor, and an autonomous vehicle, to simplify a structure of a photoelectric scanning apparatus and reduce a coupling failure probability of a power transmission assembly and/or a signal transmission assembly in the photoelectric scanning apparatus.

According to a first aspect, an embodiment of this application provides a photoelectric scanning apparatus. The photoelectric scanning apparatus includes a motor, a wireless transmission assembly, and an environment detection apparatus. The motor includes a stator, a rotor, and a base, the stator is fixedly mounted on the base, and the rotor is sleeved on the stator. The wireless transmission assembly includes a first coil and a second coil, the first coil and the environment detection apparatus are both mounted on the rotor, the first coil is electrically connected to the environment detection apparatus, and the second coil is mounted on the base. The second coil is electrically connected to a control host. Wireless signal and/or power transmission is implemented between the control host and the environment detection apparatus through magnetic coupling between the first coil and the second coil.

According to the photoelectric scanning apparatus provided in this embodiment, the first coil is mounted on the rotor, the second coil is mounted on the base, and the wireless transmission assembly is mounted by using the motor. Compared with a related technology, the apparatus provided in this embodiment does not require an attachment plate. The environment detection apparatus is mounted on the rotor, so that the motor directly drives the environment detection apparatus. Compared with a related technology, the apparatus provided in this embodiment does not require a fixed shaft and a rotating body. Because the attachment plate, the fixed shaft, and the rotating body are not used, a structure of the photoelectric scanning apparatus is simpler, and an overall volume of the photoelectric scanning apparatus is reduced. In addition, a simple structure of the photoelectric scanning apparatus helps reduce a quantity of times of assembly in an assembly process of the photoelectric scanning apparatus, lowering an accumulated tolerance caused by a plurality of times of assembly, and reducing a failure probability of magnetic coupling between the first coil and the second coil in the wireless transmission assembly.

In a possible implementation, the base includes a bottom plate and a round-ring sidewall disposed on the bottom plate, the round-ring sidewall and the stator are coaxial, and the stator and the rotor are located in a sidewall space enclosed by the round-ring sidewall. In such a design, the stator and the rotor are disposed in the sidewall space. This can protect the stator and the rotor and avoid influence of an external object on motion of the rotor.

In a possible implementation, the first coil is mounted on an outer circumferential surface of the rotor, the second coil is mounted on an inner wall surface of the round-ring sidewall, and the second coil is sleeved on an outer side of the first coil coaxially.

In another possible implementation, a first mounting groove is disposed on the outer circumferential surface of the rotor, and the first coil is mounted in the first mounting groove. The first mounting groove is disposed, so that the first coil can be prevented from sliding on the outer circumferential surface of the rotor, ensuring installation reliability and accuracy of an installation location of the first coil. In addition, an increase in a volume of the rotor caused after the first coil is mounted on the rotor is avoided, helping reduce an overall volume of the motor.

In a possible implementation, a second mounting groove is disposed on the inner wall surface of the round-ring sidewall, and the second coil is mounted in the second mounting groove. In such a design, the second coil can be prevented from sliding on the inner wall surface of the round-ring sidewall, ensuring installation reliability and accuracy of an installation location of the second coil. In addition, such a design avoids that rotation of the rotor is affected after the second coil is mounted on the round-ring sidewall, and avoids an increase in the overall volume of the motor caused after the second coil is mounted on the round-ring sidewall.

In another possible implementation, the first coil and the second coil are located in the sidewall space, the first coil is mounted on a bottom end surface that is of the rotor and that faces the bottom plate, and the second coil is mounted on the bottom plate located inside the round-ring sidewall. In such a disposition, disposition locations of the first coil and the second coil are closer to a connection location between the base and the stator, and an assembly tolerance between the base and the stator has less impact on a coupling tolerance between the first coil and the second coil, reducing a failure probability of magnetic coupling between the first coil and the second coil.

In another possible implementation, a third mounting groove is disposed on the bottom end surface of the rotor, and the first coil is mounted in the third mounting groove. The third mounting groove is disposed, so that the first coil can be prevented from sliding on the bottom end surface, ensuring installation reliability and accuracy of an installation location of the first coil. In addition, this can avoid an increase in a volume of the rotor caused after the first coil is mounted on the rotor, helping reduce the overall volume of the motor.

In a possible implementation, a fourth mounting groove is disposed on a side surface that is of the bottom plate and that faces the rotor, and the second coil is mounted in the fourth mounting groove. In such a design, the second coil can be prevented from sliding on the inner wall surface of the round-ring sidewall, ensuring installation reliability and accuracy of an installation location of the second coil. In addition, this avoids that rotation of the rotor is affected after the second coil is mounted on the bottom plate, and avoids an increase in the overall volume of the motor caused after the second coil is mounted on the bottom plate.

In a possible implementation, the stator and the base are connected by using a first flange. The first flange is used to connect the stator and the base, which is convenient and reliable and easy to assemble and disassemble, and facilitates maintenance in the motor.

In a possible implementation, the stator and the base are of an integrated structure. The stator and the base are designed into the integrated structure, so that the motor is further integrated, a step of assembling the stator and the base is omitted, and a quantity of times of assembly in an assembly process of the motor is reduced, lowering an accumulated tolerance caused by a plurality of times of assembly.

In a possible implementation, the wireless transmission assembly further includes a third coil and a fourth coil. The third coil is mounted on the rotor, and the fourth coil is mounted on the base. Wireless power transmission is implemented between the control host and the environment detection apparatus through magnetic coupling between the first coil and the second coil. Wireless signal transmission is implemented between the control host and the environment detection apparatus through magnetic coupling between the third coil and the fourth coil. The first coil and the second coil are used for wireless power transmission, and the third coil and the fourth coil are used for wireless signal transmission. A wireless signal and wireless power are transmitted by using independent coils. Therefore, efficiency and reliability of transmission are higher.

In a possible implementation, the first coil is disposed on the outer circumferential surface of the rotor, and the second coil is disposed on the base and is sleeved on the outer side of the first coil coaxially. The third coil is disposed on the bottom end surface that is of the rotor and that faces the base, and the fourth coil is mounted on the base. The first coil and the second coil that are used for wireless signal transmission as well as the third coil and the fourth coil that are used for wireless power transmission are disposed at different locations, so that mutual interference between the wireless signal transmission and wireless power transmission can be avoided.

In a possible implementation, both the first coil and the third coil are disposed on the outer circumferential surface of the rotor. The second coil is disposed on the base and is sleeved on the outer side of the first coil coaxially, and the fourth coil is disposed on the base and is sleeved on an outer side of the third coil coaxially. In such a design, the first coil and the third coil are disposed in a same plane of the rotor, so that installation of the first coil and the third coil is more convenient.

In a possible implementation, both the first coil and the third coil are disposed on the bottom end surface that is of the rotor and that faces the base, and both the second coil and the fourth coil are mounted on the base. In such a design, the first coil and the third coil are disposed in a same plane of the rotor, so that installation of the first coil and the third coil is more convenient. In addition, disposition locations of the first coil and the third coil are closer to a connection location between the base and the stator, and an assembly tolerance between the base and the stator has less impact on an installation tolerance between the first coil and the third coil.

In a possible implementation, a magnetic isolation part is disposed between the first coil and the rotor. The magnetic isolation part is disposed, so that interference to the wireless power transmission that is from a magnetic field generated when the motor operates can be avoided.

In a possible implementation, the signal transmission assembly further includes a signal inner magnetic ring and a signal outer magnetic ring, the third coil is wound around the signal inner magnetic ring, and the fourth coil is wound around the signal outer magnetic ring. The signal inner magnetic ring and the signal outer magnetic ring are disposed, so that an installation foundation may be provided for the third coil and the fourth coil, to support the third coil and the fourth coil. In addition, both the signal inner magnetic ring and the signal outer magnetic ring are ring structures made of magnetizer, and have an anti-interference function.

In a possible implementation, a connection interface configured to mount the environment detection apparatus is disposed at one end of the rotor. In such a design, the environment detection apparatus can be directly connected to the rotor by using the connection interface, which facilitates assembly and disassembly and replacement of the environment detection apparatus.

In a possible implementation, the connection interface includes two mounting blocks symmetrically disposed relative to an axis of the rotor, and a mounting hole is disposed on the mounting block. In such a design, the environment detection apparatus can be directly mounted on the motor by using a bolt that passes through the mounting hole, which is simple and convenient. In addition, the mounting block and the mounting hole are easy to process and implement.

In a possible implementation, the environment detection apparatus includes a laser radar, an infrared radar, a millimeter-wave radar, or a camera.

According to a second aspect, an embodiment of this application provides a motor, configured to drive an environment detection apparatus. The motor includes a stator, a rotor, a base, and a wireless transmission assembly. The stator is fixedly mounted on the base, the rotor is sleeved on the stator, the wireless transmission assembly includes a first coil and a second coil, the first coil is mounted on the rotor, and the second coil is mounted on the base. The environment detection apparatus is mounted on the rotor and is electrically connected to the first coil. The second coil is electrically connected to a control host that controls the environment detection apparatus. Wireless signal and/or power transmission is implemented between the control host and the environment detection apparatus through magnetic coupling between the first coil and the second coil.

According to the motor provided in this embodiment, the first coil is mounted on the rotor, the second coil is mounted on the base, and the wireless transmission assembly is mounted by using the motor. Compared with a related technology, the apparatus provided in this embodiment does not require an attachment plate. The environment detection apparatus is mounted on the rotor, so that the motor directly drives the environment detection apparatus. Compared with a related technology, the apparatus provided in this embodiment does not require a fixed shaft and a rotating body. Because the attachment plate, the fixed shaft, and the rotating body are not used, a structure of the motor is simpler, this facilitates miniaturization of the motor, and further an overall volume of the photoelectric scanning apparatus is reduced. In addition, a simple structure of the motor helps reduce a quantity of times of assembly in an assembly process of the motor, lowering an accumulated tolerance caused by a plurality of times of assembly, and reducing a failure probability of magnetic coupling between the first coil and the second coil in the wireless transmission assembly.

According to a third aspect, an embodiment of this application provides an autonomous vehicle, including a vehicle body, and the photoelectric scanning apparatus according to the first aspect mounted on the vehicle body, or the motor according to the second aspect mounted on the vehicle body. Because the autonomous vehicle includes the photoelectric scanning apparatus according to the first aspect or the motor according to the second aspect, the autonomous vehicle also has advantages of the photoelectric scanning apparatus or the motor. For details, refer to the foregoing related descriptions. The details are not described herein again.

DESCRIPTION OF EMBODIMENTS

It should be noted that, for ease of description, this specification describes a motor structure by using a Y-axis coordinate direction marked in the accompanying drawings as an up direction or a down direction. Apparently, the up direction or the down direction is an orientation or a location relationship shown based on the accompanying drawings, and is merely intended to facilitate description of this application and simplify description, but not to indicate or imply that an indicated apparatus or element shall have a specific orientation, or be constructed and operated in a specific orientation. Therefore, this cannot be construed as a limitation on this application.

Figure 1:
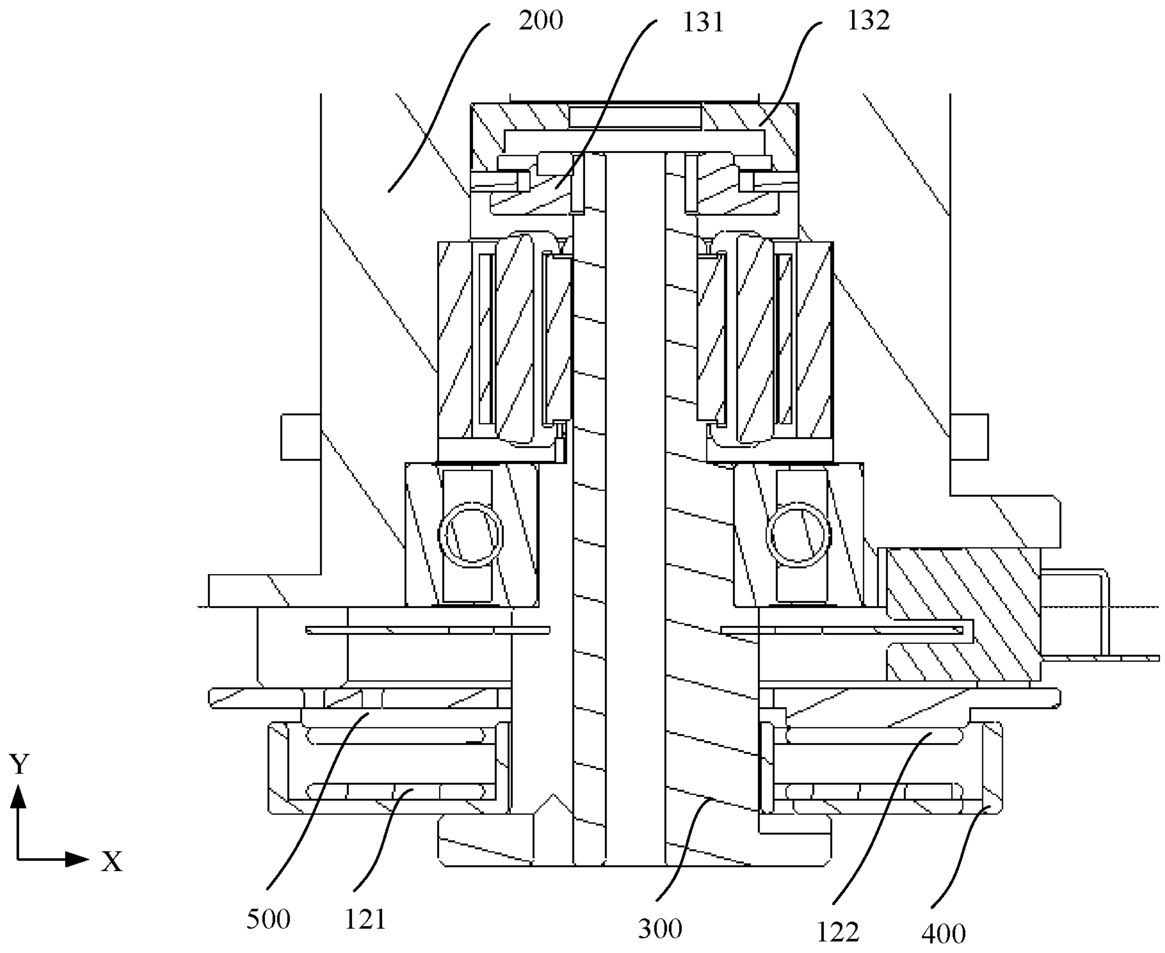
FIG. 1 is a sectional view of a motor in a related technology.

In a related technology, the photoelectric scanning apparatus includes a radar and a motor. A separable motor is used as the motor. As shown in FIG. 1, the motor includes a stator, a rotor, a fixed shaft 300, and a rotating body 200. A shaft hole is disposed in the middle of the rotating body 200, the fixed shaft 300 passes through and is mounted in the shaft hole, and a bearing is disposed between the fixed shaft 300 and an inner wall of the shaft hole. The stator is mounted on the fixed shaft 300, and the rotor is mounted on the rotating body 200. The radar is mounted on the rotating body 200 and is rotated with the rotating body 200, to expand an identification range of the radar. The motor further includes a wireless transmission assembly. The wireless transmission assembly includes a power transmission assembly and a signal transmission assembly. The power transmission assembly is used for wireless power transmission required when the radar operates, and the signal transmission assembly is used for wireless signal transmission required when the radar operates. The power transmission assembly includes a power transmission inner ring 121, a power transmission outer ring 122, a first power transmission leading wire (not shown in the figure), and a second power transmission leading wire (not shown in the figure). The signal transmission assembly includes a signal inner ring 131, a signal outer ring 132, a first signal leading wire (not shown in the figure), and a second signal leading wire (not shown in the figure).

The power transmission inner ring 121 is mounted on the fixed shaft 300 by using a first attachment plate 400, and the power transmission outer ring 122 is mounted on the rotating body 200 by using a second attachment plate 500. The second attachment plate 500 may be disposed on one end of the rotating body 200, and is located between the first attachment plate 400 and the rotating body 200. One end of the first power transmission leading wire is connected to the power transmission inner ring 121, and the other end of the first power transmission extends from the bottom of the motor and is connected to an external power supply. One end of the second power transmission leading wire is connected to the power transmission outer ring 122, and the other end of the second power transmission leading wire passes through a central hole opened in the fixed shaft 300, and extends from the top of the rotating body 200 and is connected to the radar. When the photoelectric scanning apparatus operates, an operating current is transmitted from the first power transmission leading wire to the power transmission inner ring 121, the power transmission inner ring 121 implements wireless power transmission to the power transmission outer ring 122 through magnetic coupling, and the power transmission outer ring 122 transmits the operating current to the radar through the second power transmission leading wire.

The signal inner ring 131 is sleeved on the fixed shaft 300, and is close to the top of the fixed shaft 300. The signal outer ring 132 is mounted in the shaft hole of the rotating body 200, and is in an interference fit with the inner wall of the shaft hole. One end of the first signal leading wire is connected to the signal inner ring 131, and the other end of the first signal leading wire extends downward, passing through the fixed shaft 300, and extends from the bottom of the fixed shaft 300, to connect to a control apparatus. One end of the second signal leading wire is connected to the signal outer ring 132, and the other end of the second signal leading wire extends from the rotating body 200 and is connected to the radar. When the photoelectric scanning apparatus operates, a control signal is transmitted from the first signal leading wire to the signal inner ring 131, the signal inner ring 131 implements wireless signal transmission to the signal outer ring 132 through magnetic coupling, and the signal outer ring 132 transmits the control signal to the radar through the second signal leading wire.

During assembly of the motor, the first attachment plate 400, the signal inner ring 131, and the stator are usually first mounted on the fixed shaft 300, and the power transmission inner ring 121 is mounted on the first attachment plate 400. Next, one end of the first signal leading wire is connected to the signal inner ring 131, and the other end of the first signal leading wire extends downward, passing through the central hole of the fixed shaft 300, and extends from the bottom of the fixed shaft 300 beyond the rotating body 200. In this way, routing of the first signal leading wire is completed. Then, the second attachment plate 500, the bearing, the rotor, and the signal outer ring 132 are installed in the shaft hole of the rotating body 200, and the power transmission outer ring 122 is mounted on the second attachment plate 500. Next, one end of the second power transmission leading wire is connected to the power transmission outer ring 122, and the other end of the second power transmission leading wire extends upward, passing through the central hole of the fixed shaft 300, and extends from the top of the fixed shaft 300 and the rotating body 200. In this way, routing of the second power transmission leading wire is completed. Finally, the assembled fixed shaft 300 is inserted into the shaft hole of the rotating body 200.

In the motor in the foregoing related technology, the motor includes a large quantity of components, resulting in a complex structure. In addition, it can be learned from the assembly process of the motor that, because the motor is of a separable design, a plurality of times of assembly are required in a process of forming the motor through combination and assembly. However, the plurality of times of assembly cause a high accumulated tolerance, and affect precision of relative locations of the power transmission inner ring 121 and the power transmission outer ring 122 and precision of relative locations of the signal inner ring 131 and the signal outer ring 132. As a result, a failure probability of magnetic coupling between the power transmission inner ring 121 and the power transmission outer ring 122 and a failure probability of magnetic coupling between the signal inner ring 131 and the signal outer ring 132 are increased. In addition, the second power transmission leading wire needs to pass through the central hole of the fixed shaft 300, the first signal leading wire needs to pass through the central hole of the fixed shaft 300, and the fixed shaft 300 is long. As a result, processing difficulty of the central hole of the fixed shaft 300 is high. Because the fixed shaft 300 is long, the second power transmission leading wire and the first signal leading wire that pass through the fixed shaft 300 also need to be long. This increases costs, and an excessively long first signal leading wire tends to cause a security risk.

In view of this, in a photoelectric scanning apparatus provided in embodiments of this application, an environment detection apparatus and a wireless transmission assembly are mounted on a motor, and the wireless transmission assembly is mounted by using a structure of the motor. Compared with the apparatus in the related technology, the photoelectric scanning apparatus provided in embodiments of this application does not require the attachment plate; and the motor directly drives the environment detection apparatus, and compared with the motor in the related technology, the motor in embodiments of this application does not require the fixed shaft 300 and the rotating body 200. The attachment plate, the fixed shaft 300, and the rotating body 200 are not used, so that a structure of the photoelectric scanning apparatus is simpler. In addition, because a quantity of components included in the photoelectric scanning apparatus is reduced, a quantity of times of assembly is reduced, lowering an accumulated tolerance caused by a plurality of times of assembly, and reducing a failure probability of coupling between coupled coils in the wireless transmission assembly. In addition, a first signal leading wire and a second power transmission leading wire do not need to pass through the central hole of the fixed shaft 300, so that there is no need to perform drilling processing on a shaft-type component, reducing cabling difficulty.

To make the foregoing objectives, features, and advantages of embodiments of this application clearer, the following clearly describes technical solutions of embodiments of this application with reference to the accompanying drawings in embodiments of this application. It is clear that the described embodiments are merely some but not all of embodiments of this application. All other embodiments obtained by persons of ordinary skill in the art based on embodiments of this application without creative efforts shall fall within the protection scope of this application.

Figure 2:
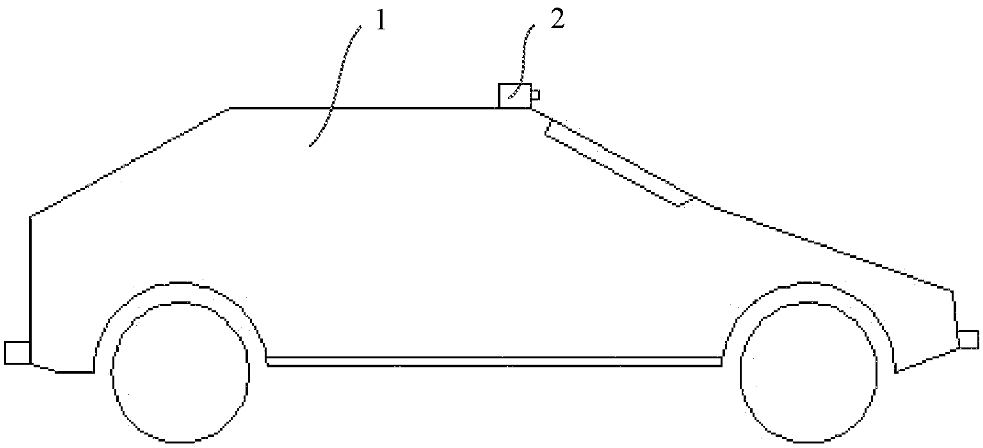
FIG. 2 is a schematic diagram of a structure of an autonomous vehicle according to an embodiment of this application.

FIG. 2 is a schematic diagram of a structure of an autonomous vehicle according to an embodiment of this application. As shown in FIG. 2, an autonomous vehicle (full name: Autonomous vehicle in English), also referred to as a self-driving vehicle, is an intelligent vehicle that implements self driving by using a computer system. In this embodiment, the autonomous vehicle includes a vehicle body 1, a control host, and a photoelectric scanning apparatus 2. The vehicle body 1 includes a vehicle frame, a chassis, and a power apparatus, which is similar to a conventional vehicle. Details are not described herein again. The photoelectric scanning apparatus 2 is placed on the top of the vehicle frame or at another location at which a field of view is not blocked. The control host is installed in the vehicle body 1. The control host includes a power supply and a control apparatus. The power supply supplies power to the photoelectric scanning apparatus 2. The control apparatus transmits a control signal to the photoelectric scanning apparatus 2, to control the photoelectric scanning apparatus 2 to detect and identify an ambient environment, and further make a behavior decision based on obtained environment information, to implement autonomous driving.

Figure 3:
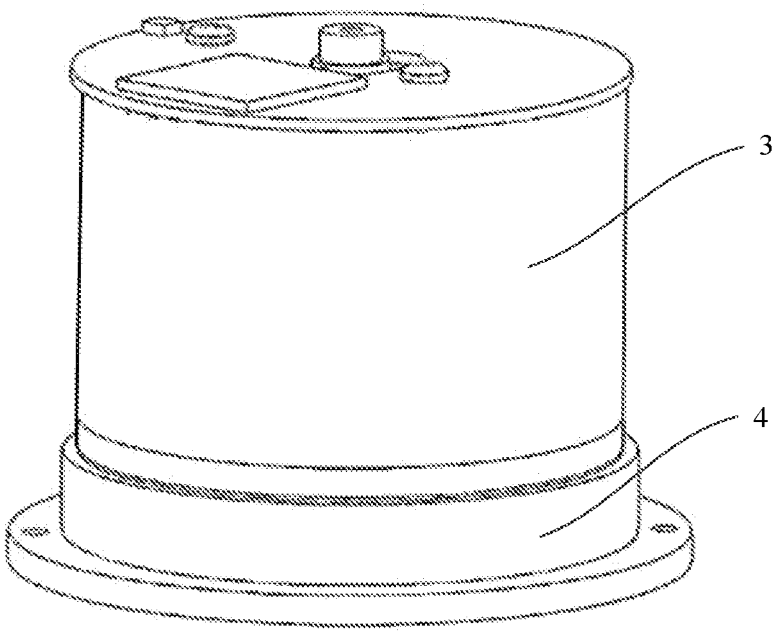
FIG. 3 is a schematic diagram of a structure of a photoelectric scanning apparatus according to an embodiment of this application.

FIG. 3 is a schematic diagram of a structure of a photoelectric scanning apparatus according to an embodiment of this application. As shown in FIG. 3, the photoelectric scanning apparatus 2 includes a motor 4 and an environment detection apparatus 3. The environment detection apparatus 3 includes but is not limited to a laser radar, an infrared radar, a millimeter-wave radar, or a camera. The environment detection apparatus 3 rotates under driving of the motor 4, to obtain a larger scanning range, so as to expand an identification range of the photoelectric scanning apparatus 2.

In this embodiment, the motor 4 is configured to drive the environment detection apparatus 3 to rotate, and the motor 4 includes a stator and a rotor. Generally, a portion of the motor 4 that maintains stationary when the motor 4 operates is collectively referred to as a stator, and a main function of the stator is to generate a magnetic field. A portion of the motor 4 that rotates when the motor 4 operates is collectively referred to as a rotor. A main function of the rotor is to generate electromagnetic torque and induced electromotive force, and the rotor is a hub for energy conversion of the motor 4.

Scenario 1

Figure 4:
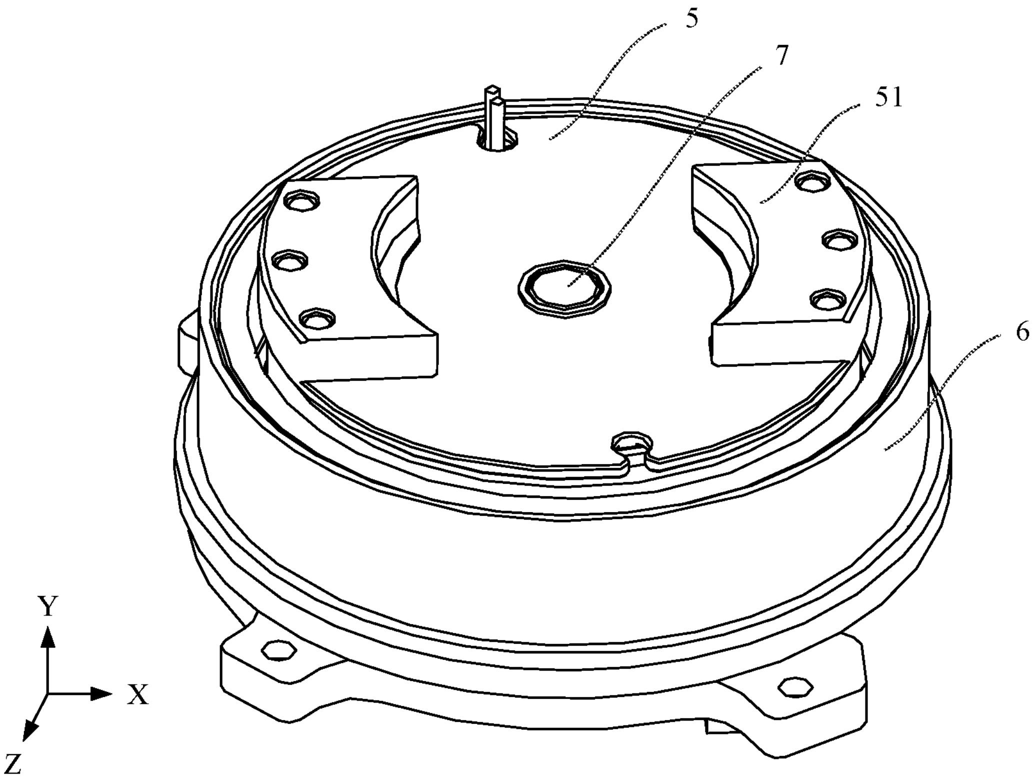
FIG. 4 is a schematic diagram of a structure of a motor according to an embodiment of this application.
Figure 5:
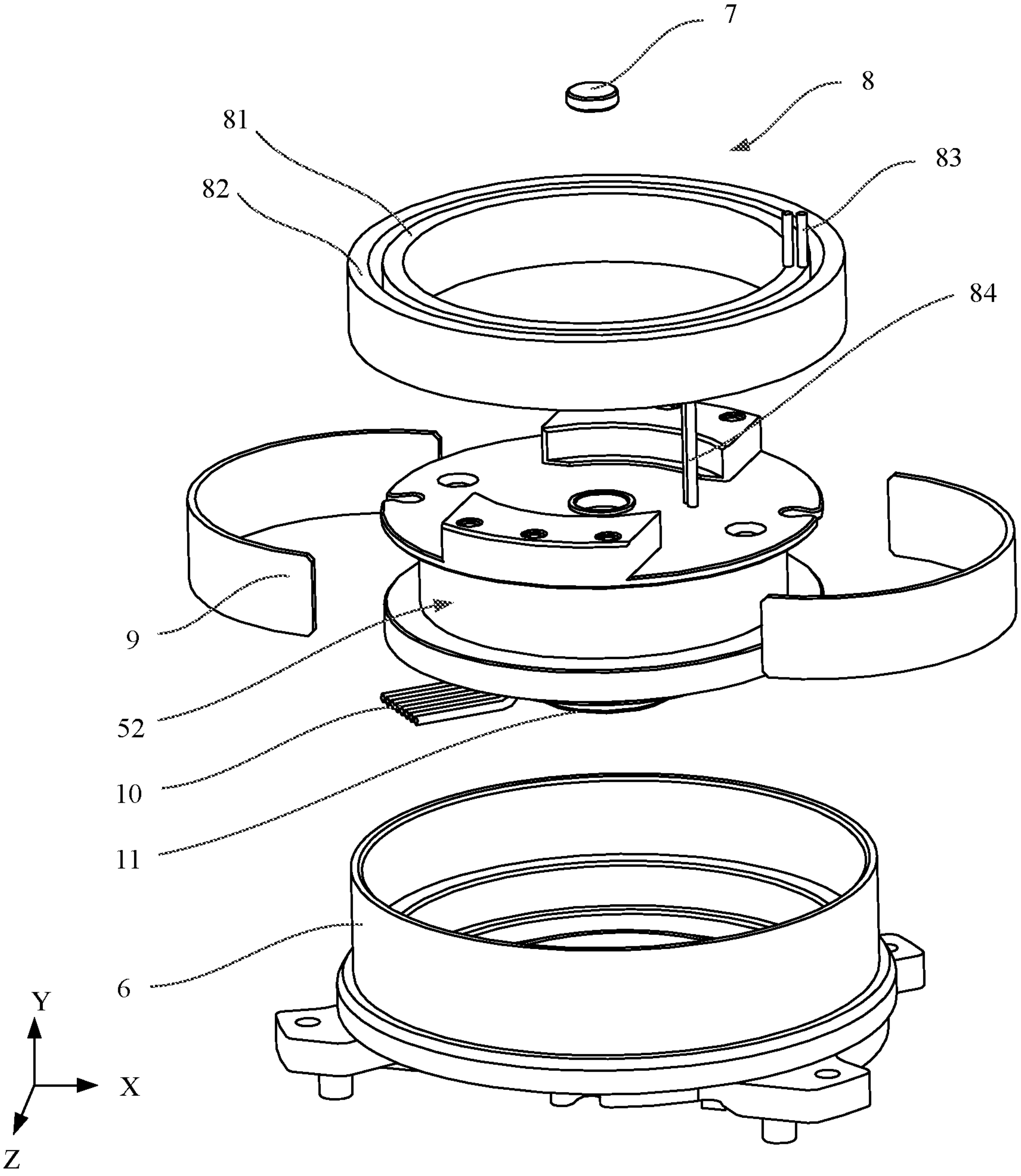
FIG. 5 is an exploded view of the motor in FIG. 4.

FIG. 4 is a schematic diagram of a structure of a motor according to an embodiment of this application. FIG. 5 is an exploded view of the motor in FIG. 4. As shown in FIG. 4 and FIG. 5, the motor 4 includes a stator 11, a rotor 5, a base 6, and a wireless transmission assembly 8. The wireless transmission assembly 8 includes a first coil 81 and a second coil 82. The second coil 82 and the second coil 82 are coaxial ring structures and implement wireless transmission of a control signal and/or an operating current through magnetic coupling. Refer to FIG. 5. The wireless transmission assembly 8 further includes a first leading wire 83 connected to the first coil 81 and a second leading wire 84 connected to the second coil 82. The first leading wire 83 extends upward, and extends from the top of the rotor 5 to connect to the environment detection apparatus 3 mounted on the motor 4. The second leading wire 84 extends downward, and extends from the bottom of the base 6 to connect to the control host.

Figure 6:
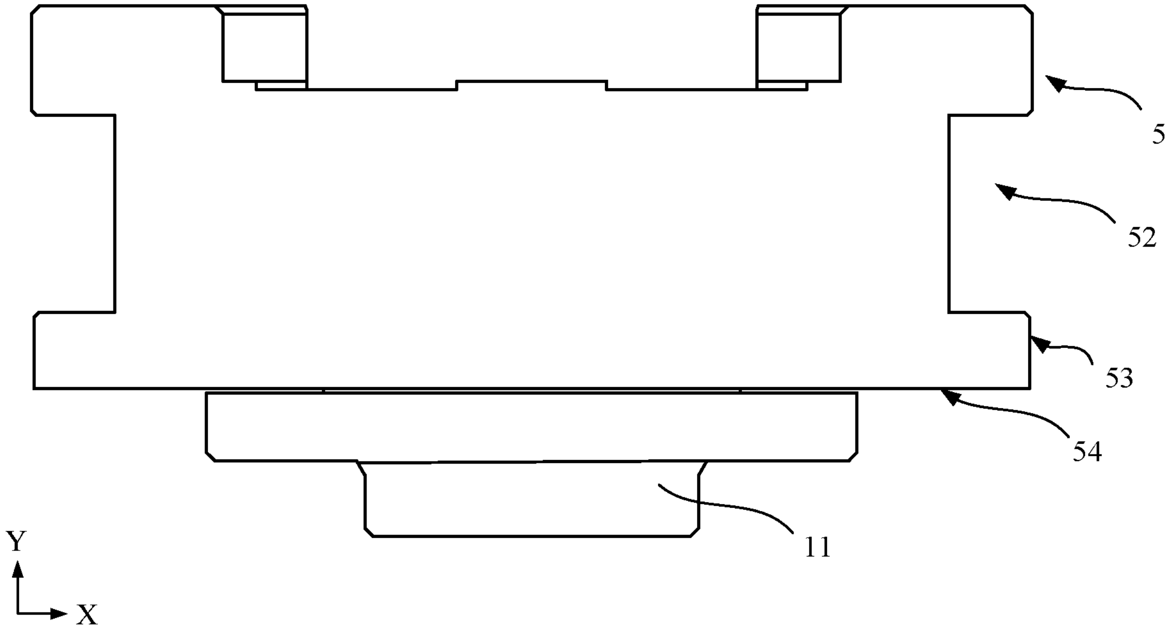
FIG. 6 is a main view of a rotor and a stator in FIG. 5.

FIG. 6 is a main view of the rotor 5 and the stator 11 shown in FIG. 5. As shown in FIG. 6, the motor 4 is usually vertically placed, and a central axis of the stator 11 is defined as a first axis. In this embodiment, the first axis is a vertical straight line, that is, the first axis is parallel to a Y axis of a coordinate system in FIG. 6. The rotor 5 is sleeved and mounted on the stator 11, and can rotate around the first axis. A lower end of the stator 11 extends from a bottom end surface 54 of the rotor 5, and the stator 11 is further connected to a motor leading wire 10 that is configured to control the motor 4 to work normally. A first flange is connected to a bottom end of the stator 11, and the base 6 is disposed below the stator 11, and is connected to the stator 11 by using the first flange, so that the base 6 and the stator 11 are fixedly installed. In this implementation, the first flange is disposed, to facilitate connection and disassembly between the stator 11 and the base 6, and facilitate maintenance of the motor 4. In a possible implementation, the base 6 and the stator 11 are of an integrated structure, that is, the base 6 is a part of the stator 11. In such a design, the first flange and a fastener passing through the first flange are not used, so that the motor 4 is further integrated, a quantity of times of assembly in an assembly process of the motor 4 is reduced, and an accumulated tolerance in a plurality of times of assembly is lowered.

As shown in FIG. 6, the rotor 5 is a rotary structure using the first axis as the central axis, a mounting hole is disposed in the middle of the rotor 5, and the rotor 5 is sleeved on the stator 11. The rotor 5 includes a vertically-extended outer circumferential surface 53 and a horizontally-extended top surface and bottom end surface 54. The outer circumferential surface 53 is provided with a first mounting groove 52, the first mounting groove 52 is an annular groove around the first axis, and a center line of the annular groove coincides with the first axis. The first mounting groove 52 has a groove bottom surface. The first coil 81 is installed in the first mounting groove 52, a magnetic isolation part 9 is disposed between the first coil 81 and the groove bottom surface of the first mounting groove 52, and the magnetic isolation part 9 is configured to avoid interference to the wireless transmission assembly 8 that is from a magnetic field generated when the motor 4 operates. The magnetic isolation part 9 is a ring structure attached to the groove bottom surface of the first mounting groove 52, for example, may include two semicircular magnetic isolation tiles that are connected or spliced to each other.

Figure 7:
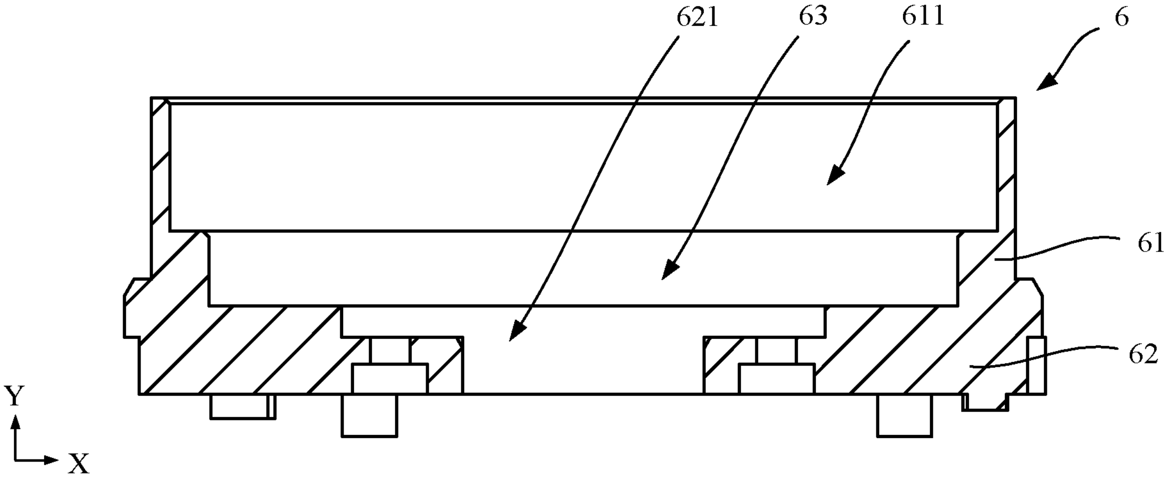
FIG. 7 is a sectional view of a base in FIG. 5.

FIG. 7 is a sectional view of the base 6 shown in FIG. 5. As shown in FIG. 7, the base 6 is a mechanical part coaxially disposed with the stator 11. For example, the base 6 may be a disk structure having an opening at the top, and an axis of the disk structure coincides with an axis of the stator 11. The base 6 includes a bottom plate 62 and a round-ring sidewall 61 mounted on the bottom plate 62. The bottom plate 62 may be a circular plate using the first axis as a central axis, a middle hole 621 is disposed at a location corresponding to the first axis that is on the bottom plate 62, and a lower end of the stator 11 passes through and is mounted in the middle hole 621.

The round-ring sidewall 61 is a ring sidewall using the first axis as a central axis, the round-ring sidewall 61 extends upward from the bottom plate 62, and a space enclosed by the round-ring sidewall 61 may be defined as a sidewall space 63. After the stator 11 is connected to the bottom plate 62, both the stator 11 and the rotor 5 are located in the sidewall space 63, the top of the rotor 5 is slightly higher than the top of the round-ring sidewall 61, the bottom end surface 54 of the rotor 5 is opposite to the bottom plate 62, and the outer circumferential surface 53 of the rotor 5 is opposite to an inner wall surface of the round-ring sidewall 61. It can be learned from the foregoing description that the stator 11 and the rotor 5 are located in the sidewall space 63, and the base 6 protects the stator 11 and the rotor 5, to avoid interference from an external object to motion of the rotor 5.

A second mounting groove 611 is disposed on the inner wall surface of the round-ring sidewall 61. The second mounting groove 611 may be an annular groove body formed on the inner wall surface of the round-ring sidewall 61. A center line of the annular groove body coincides with the first axis. An opening of the second mounting groove 611 is opposite to an opening of the first mounting groove 52 and faces the first axis. The second mounting groove 611 has a groove bottom surface. The groove bottom surface is an annular surface around the first axis; and there are an upper side surface and a lower side surface that are respectively located on two sides of the groove bottom surface. To be specific, the upper side surface, the lower side surface, and the groove bottom surface form the second mounting groove 611.

In a possible implementation, the upper side surface of the second mounting groove 611 may be removed. To be specific, the second mounting groove 611 includes a groove bottom surface and a lower side surface. If a plane that the first axis goes cross is used as a cutting plane, a cross-sectional shape of the second mounting groove is an L shape. Such a design is used that the second coil 82 can be mounted in from the top of the base 6.

Figure 8:
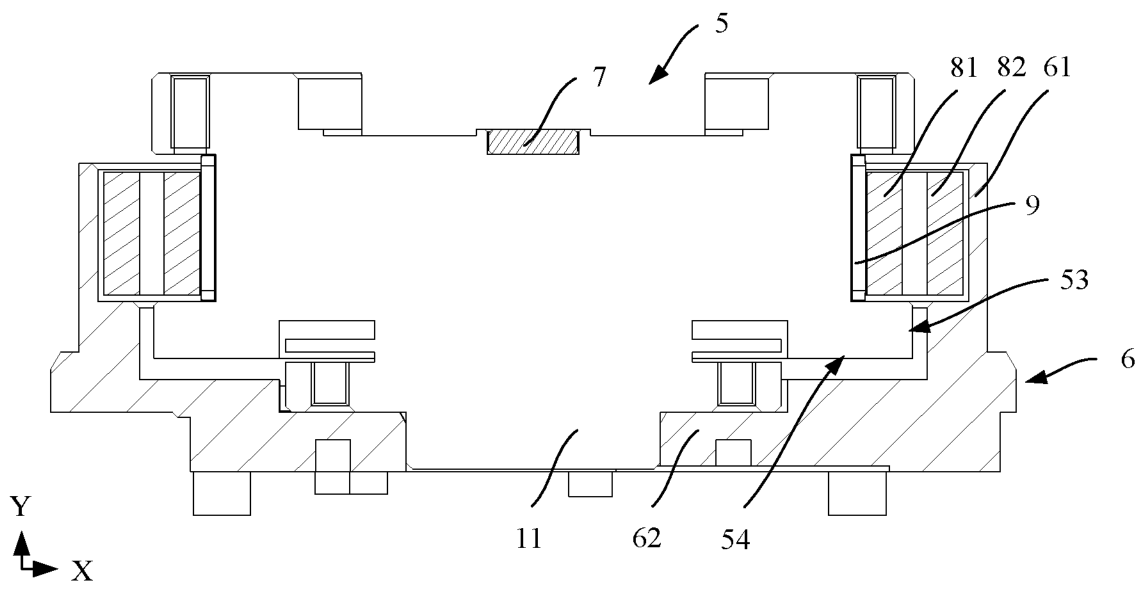
FIG. 8 is a sectional view of a motor in FIG. 5.

FIG. 8 is a sectional view of the motor shown in FIG. 5. As shown in FIG. 8, the first coil 81 is mounted in the first mounting groove 52, the second coil 82 is installed in the second mounting groove 611, the first mounting groove 52 and the second mounting groove 611 are coaxially disposed, and the second coil 82 is located on an outer side of the first coil 81. Magnetic coupling may be formed between the first coil 81 and the second coil 82, so that wireless electric energy and/or signal transmission is implemented by using an electromagnetic field obtained through coupling as a medium. The motor 4 in this embodiment may implement wireless electric energy transmission or wireless control signal transmission by using the first coil 81 and the second coil 82 that are magnetically coupled, or implement simultaneous electric energy and control signal transmission by using the first coil 81 and the second coil 82 that are magnetically coupled.

The first coil 81 and the second coil 82 are not limited to being disposed at the foregoing locations. For example, as shown in FIG. 9 to FIG. 11, the first coil 81 and the second coil 82 may alternatively be disposed between the rotor 5 and the bottom plate 62.

Figure 9:
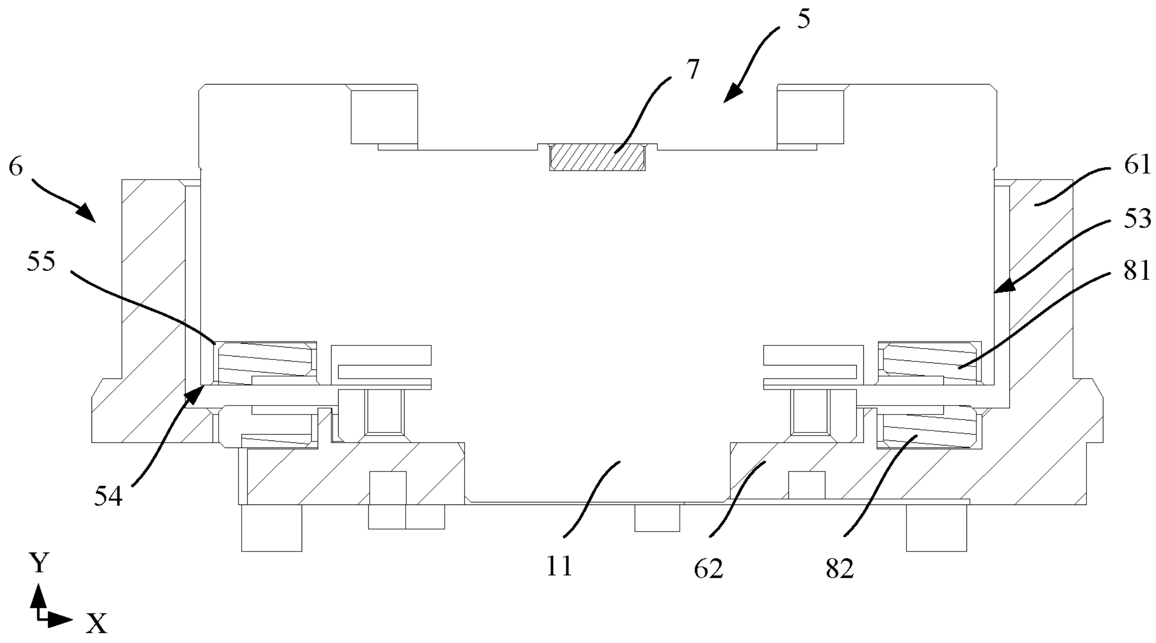
FIG. 9 is a sectional view of another implementation of the motor in FIG. 4.
Figure 10:
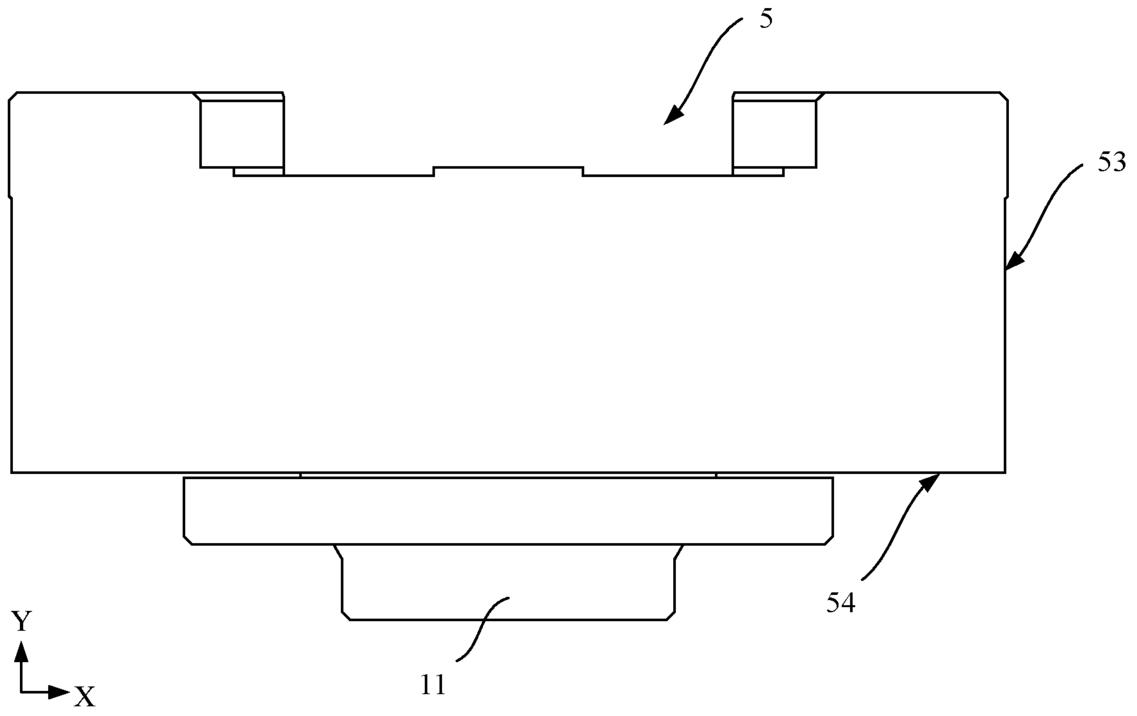
FIG. 10 is a main view of a rotor and a stator in FIG. 9.

FIG. 9 is a sectional view of another implementation of the motor in FIG. 4, and FIG. 10 is a main view of a stator and a rotor shown in FIG. 9. As shown in FIG. 9 and FIG. 10, in a possible implementation, a third mounting groove 55 is disposed on the bottom end surface 54 of the rotor 5, the third mounting groove 55 may be an annular groove around the first axis, and an opening of the annular groove faces the bottom plate 62. The first coil 81 is mounted in the third mounting groove 55, for example, may be mounted in the third mounting groove 55 in a bonding manner, an embedding manner, or a clamping manner.

Figure 11:
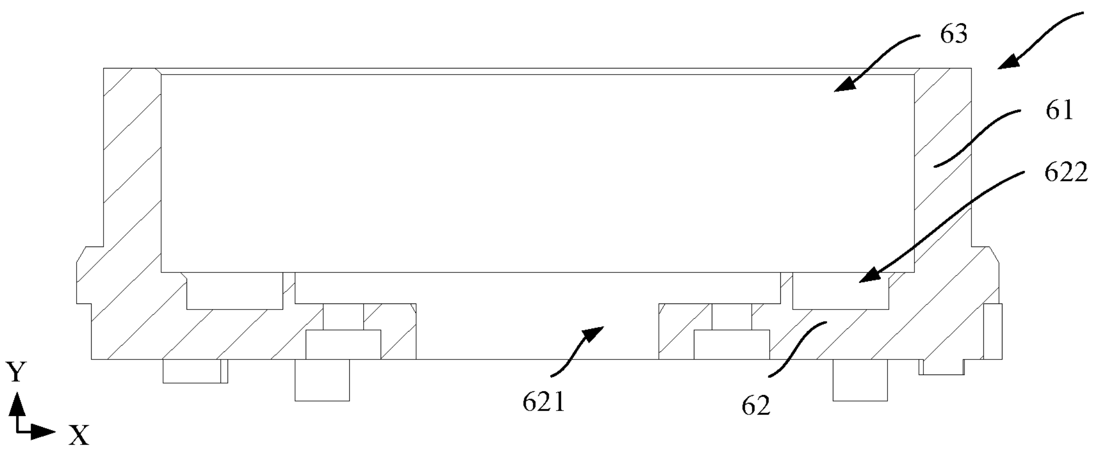
FIG. 11 is a sectional view of a base in FIG. 9.

FIG. 11 is a sectional view of a base shown in FIG. 9. As shown in FIG. 11, a fourth mounting groove 622 disposed around the first axis is disposed on a surface that is of the bottom plate 62 and that faces the rotor 5. An opening of the fourth mounting groove 622 is opposite to an opening of the third mounting groove 55 and faces the rotor 5. The fourth mounting groove 622 and the third mounting groove 55 are coaxially disposed, and the fourth mounting groove 622 is located right below the third mounting groove 55. The second coil 82 is mounted in the fourth mounting groove 622, for example, may be mounted in the fourth mounting groove 622 in a bonding manner, an embedding manner, or a clamping manner. The second coil 82 and the first coil 81 are coaxially disposed, and the second coil 82 is located below the first coil 81.

In this implementation, the first coil 81 and the second coil 82 are disposed between the bottom end surface 54 of the rotor 5 and the bottom plate 62. In this way, the first coil 81 and the second coil 82 are closer to a connection location between the base 6 and the stator 11, and precision of relative locations of the first coil 81 and the second coil 82 is easier to ensure, so that a failure probability of coupling between the first coil 81 and the second coil 82 is further reduced.

In the foregoing implementations, the first mounting groove 52 and the second mounting groove 611 are disposed, and the third mounting groove 55 and the fourth mounting groove 622 are disposed, so that locations of the first coil 81 and the second coil 82 are fixed, and accuracy of installation locations of the first coil 81 and the second coil 82 can be ensured. In addition, the first coil 81 is accommodated in the rotor 5, and the second coil 82 is accommodated in the base 6, so that the first coil 81 and the second coil 82 do not increase an additional volume of the motor, to facilitate further reducing a volume of the motor 4.

Figure 12:
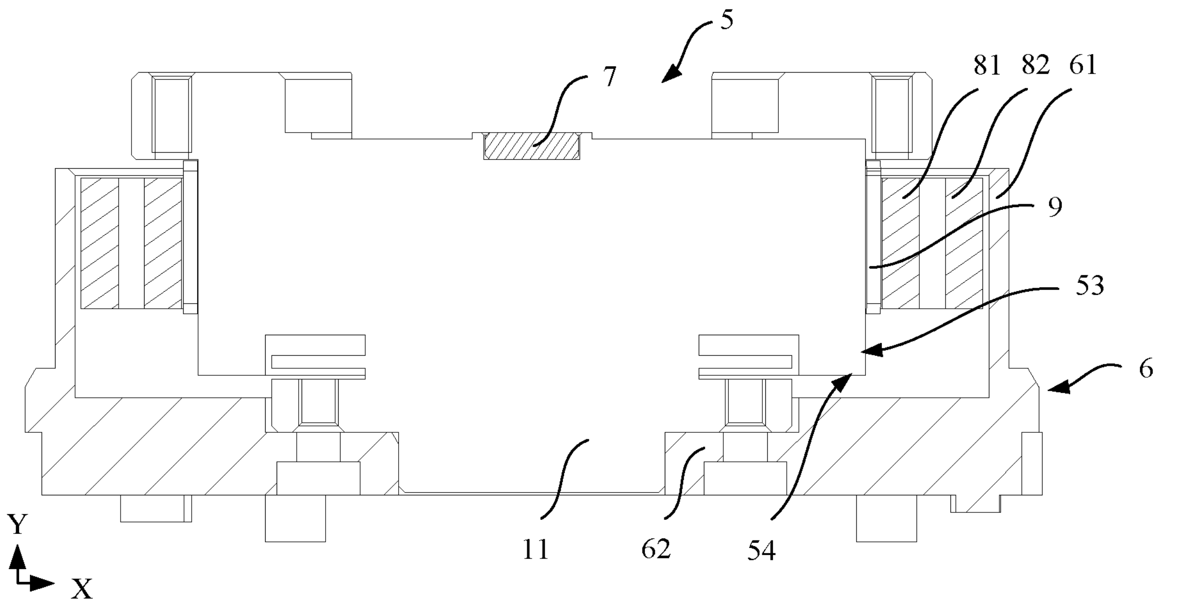
FIG. 12 is a sectional view of still another implementation of the motor in FIG. 4.
Figure 13:
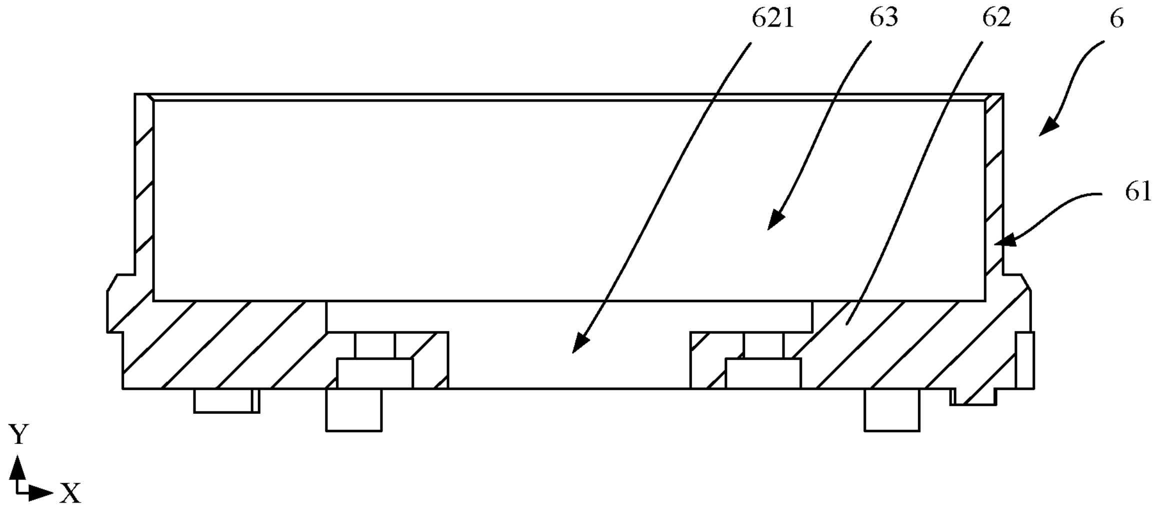
FIG. 13 is a sectional view of a base in FIG. 12.

FIG. 12 and FIG. 13 each are a schematic diagram of a structure of another implementation of a motor 4 according to this application. As shown in FIG. 12 and FIG. 13, in this embodiment, a first mounting groove 52 does not need to be disposed on an outer circumferential surface 53 of a rotor 5, a second mounting groove 611 does not need to be disposed on a base 6, and a first coil 81 in the motor 4 is directly sleeved on the outer circumferential surface 53 of the rotor 5. A second coil 82 is directly mounted on a round-ring sidewall 61 by using an adhesive, by using a connecting piece, through an interference fit, or the like.

In a possible implementation, a third mounting groove 55 does not need to be disposed on a bottom end surface 54 of the rotor 5, and a fourth mounting groove 622 does not need to be disposed on a bottom plate 62. The first coil 81 is mounted on the bottom end surface 54 of the rotor 5 by using an adhesive, by using a connecting piece, or the like, and the second coil 82 is mounted on the bottom plate 62 by using an adhesive, by using a connecting piece, or the like.

An operating principle of the motor 4 is as follows: When the motor 4 operates, the rotor 5 rotates around a first axis and on a stator 11, to drive an environment detection apparatus 3 to rotate. A power supply current of a power supply in a control host and/or a control signal of a control apparatus in the control host enter/enters the second coil 82 through a second leading wire 84, and the second coil 82 wirelessly transmits the power supply current and/or the control signal to the first coil 81 through magnetic coupling between the coils. The power supply current and/or the control signal are further transmitted to the environment detection apparatus 3 mounted on the motor 4 through a first leading wire 83, to control or supply power to the environment detection apparatus 3.

Scenario 2

FIG. 14 to FIG. 18 show another motor 4 according to an embodiment of this application. It can be learned from FIG. 14 and FIG. 18 that the motor 4 includes a stator 11, a rotor 5, a base 6, and two wireless transmission assemblies. Structure composition, installation manners, or connection manners of the stator 11, the rotor 5, and the base 6 are the same as structure composition, installation manners, or connection manners of the stator 11, the rotor 5, and the base 6 in the foregoing scenario 1. Refer to related descriptions in the foregoing scenario 1. Therefore, details are not described again. A difference between this embodiment and the foregoing embodiment lies in that, in this embodiment, the two wireless transmission assemblies: a power transmission assembly 12 used for power transmission and a signal transmission assembly 13 used for signal transmission, are included.

Figure 14:
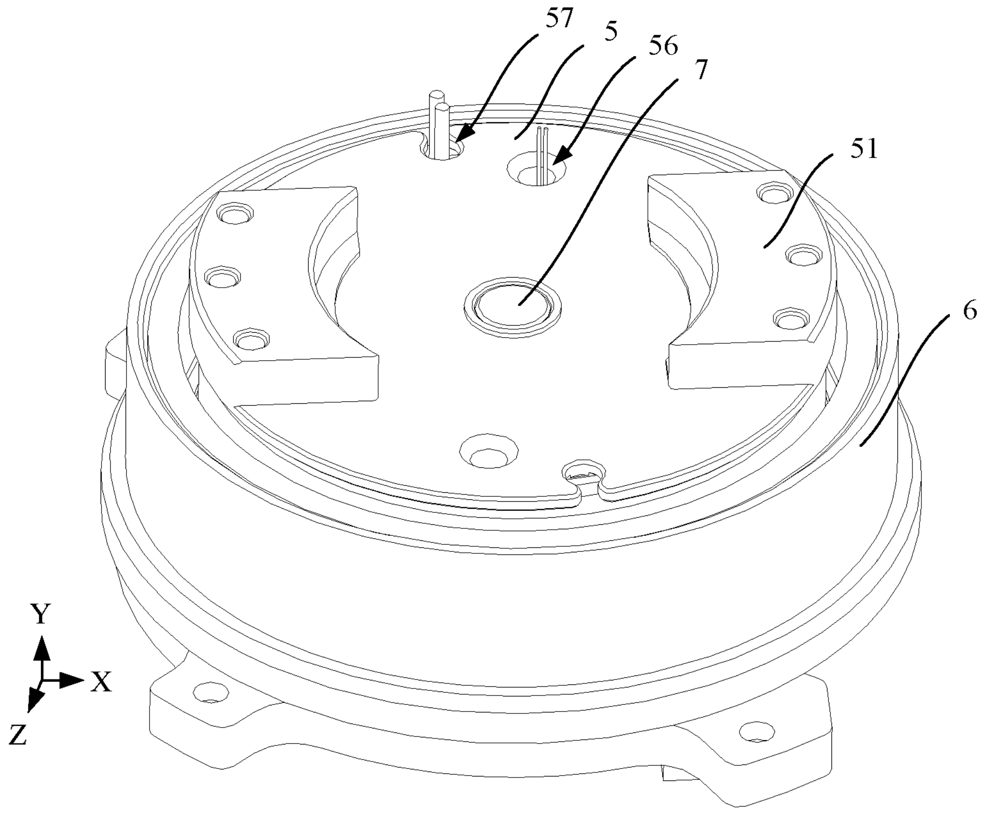
FIG. 14 is a schematic diagram of a structure of a motor according to another embodiment of this application.

FIG. 14 is a schematic diagram of a structure of a motor according to another embodiment of this application. As shown in FIG. 14, a first extension hole 57 and a second extension hole 56 are disposed on a top surface of the rotor 5, and the first extension hole 57 and the second extension hole 56 are used for leading wires in the wireless transmission assemblies of the motor 4 to extend.

A connection interface and an encoding disk 7 are disposed on the top of the rotor 5. The connection interface includes kidney-shaped mounting blocks 51 symmetrically disposed relative to a first axis. At least one mounting hole is disposed on the kidney-shaped mounting block 51, the mounting hole is a threaded hole, and an environment detection apparatus 3 is mounted on the rotor 5 of the motor 4 by using a threaded fastener that passes through the threaded hole. In such a design, the environment detection apparatus 3 may be directly connected to and mounted on the motor 4, to improve convenience of assembling and disassembling the environment detection apparatus 3.

The encoding disk 7 includes a circular plate, and several rectangular holes are equally spaced on the circular plate. The encoding disk 7 and the rotor 5 are coaxially disposed. When the motor 4 rotates, the encoding disk 7 and the motor 4 rotate at a same speed. The encoding disk 7 can be used to detect a rotation speed and rotation angle of the motor 4, so that the rotation speed and rotation angle of the motor 4 can be controlled. A photoelectric scanning apparatus 2 controls a rotation speed and an orientation of the environment detection apparatus 3 by controlling the motor 4.

Figure 15:
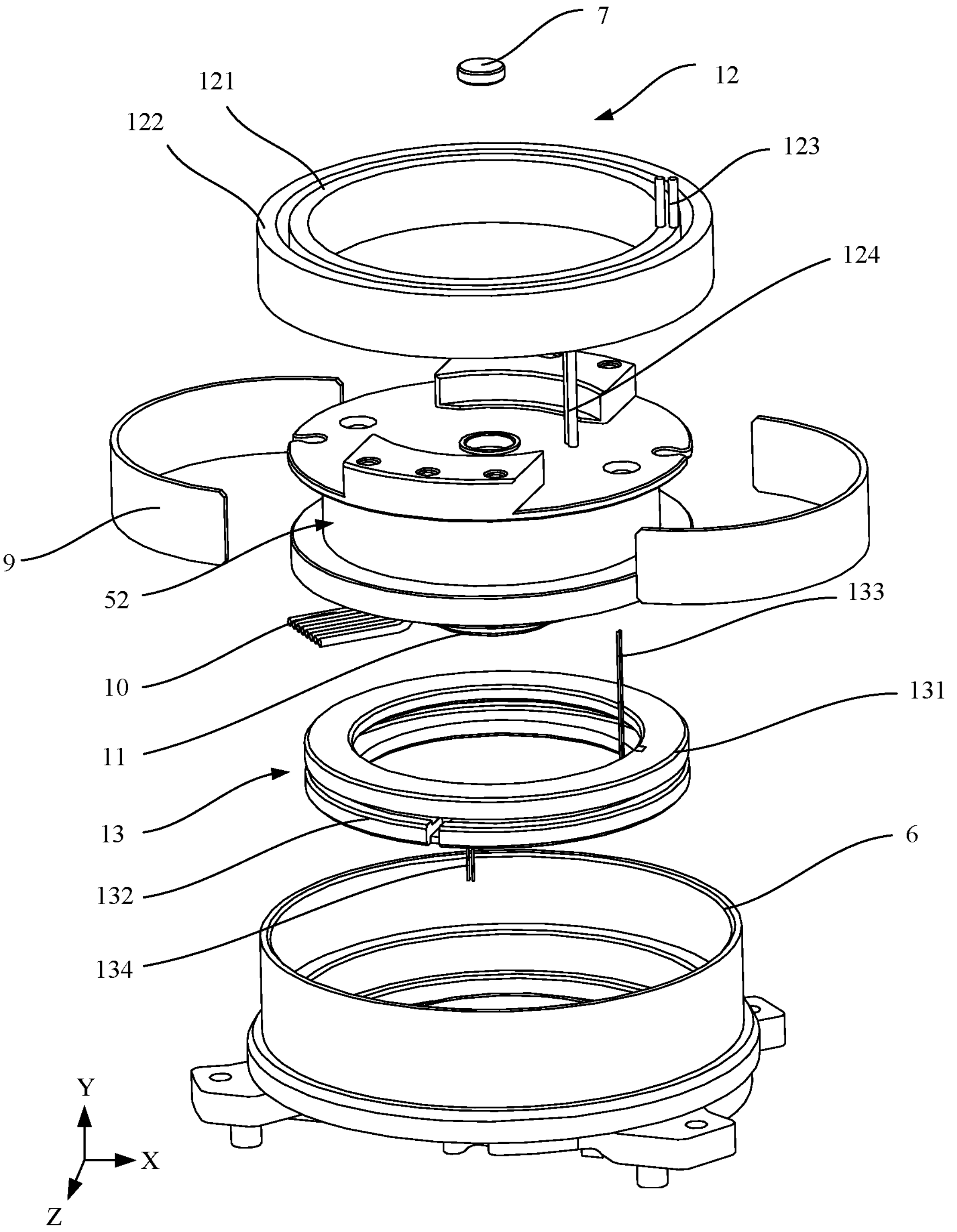
FIG. 15 is an exploded view of the motor in FIG. 14.

FIG. 15 is an exploded view of the motor in FIG. 14. Refer to FIG. 15. The power transmission assembly 12 includes a power transmission inner ring 121 and a power transmission outer ring 122, the power transmission inner ring 121 includes a power transmission inner magnetic ring and a first coil, and the first coil is wound around the power transmission inner magnetic ring. The power transmission outer ring 122 includes a power transmission outer magnetic ring and a second coil, and the second coil is wound around the power transmission outer magnetic ring. The signal transmission assembly 13 includes a signal inner ring 131 and a signal outer ring 132, the signal inner ring 131 includes a signal inner magnetic ring and a third coil, and the third coil is wound around the signal inner magnetic ring. The signal outer ring 132 includes a signal outer magnetic ring and a fourth coil, and the fourth coil is wound around the signal inner magnetic ring. The power transmission inner magnetic ring, the power transmission outer magnetic ring, the signal inner magnetic ring, and the signal inner magnetic ring have a same function and a similar structure. The power transmission inner magnetic ring is used as an example. The power transmission inner magnetic ring is a ring structure made of magnetizer, and the power transmission inner magnetic ring is an anti-interference element, configured to suppress high-frequency noise and can support the first coil.

Both the power transmission assembly 12 and the signal transmission assembly 13 further include leading wires. The leading wires include a first power transmission leading wire 123 connected to the first coil, a second power transmission leading wire 124 connected to the second coil, a first signal leading wire 133 connected to the third coil, and a second signal leading wire 134 connected to the fourth coil. The first power transmission leading wire 123 and the first signal leading wire 133 extend upward. The first power transmission leading wire 123 extends from the first extension hole 57 on the top surface of the rotor 5 and is connected to the environment detection apparatus 3, and the first signal leading wire 133 extends from the second extension hole 56 on the top surface of the rotor 5 and is connected to the environment detection apparatus 3. In a feasible implementation, the first power transmission leading wire 123 and the first signal leading wire 133 are connected to wiring terminals disposed on the top surface of the rotor 5, and the environment detection apparatus 3 is connected to mating terminals that is plugged to and matched with the wiring terminals. The first power transmission leading wire 123 and the first signal leading wire 133 can be connected to the environment detection apparatus 3 in a manner in which the wiring terminals are plugged to and matched with the mating terminals. In addition, the wiring terminal and the mating terminal can be repeatedly assembled and disassembled and used. Such a design facilitates connection and installation between the environment detection apparatus 3 and the motor 4, and facilitates assembly and disassembly, replacement, and maintenance of the environment detection apparatus 3 relative to the motor 4.

Refer to FIG. 15. The second power transmission leading wire 124 and the second signal leading wire 134 extend downward and extend from the bottom of the base 6. The second power transmission leading wire 124 is connected to a power supply in a control host, to receive electric energy that is provided by the power supply to enable the environment scanning apparatus to work. The second signal leading wire 134 is connected to a control apparatus in the control host, to receive a control signal that is sent by the control apparatus to control the environment scanning apparatus.

Figure 16:
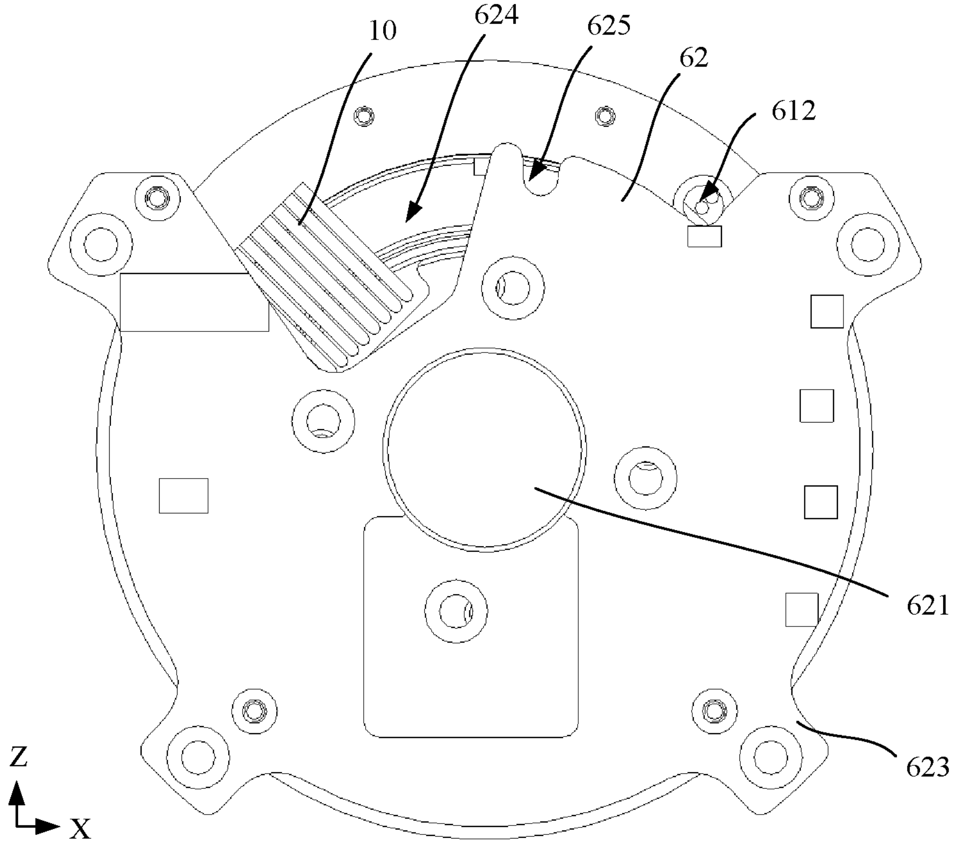
FIG. 16 is a bottom view of the motor in FIG. 14.

FIG. 16 is a bottom view of the motor in FIG. 14. Refer to FIG. 16. In a possible implementation, two notches are disposed at edge positions on the bottom plate 62. The two notches are a leading wire extension hole 624 of the motor and a third extension hole 625. The leading wire extension hole 624 of the motor corresponds to a location of a leading wire 10 of the motor, so that the leading wire 10 of the motor is allowed to extend. The third extension hole 625 is configured to enable the second signal leading wire 134 to extend, and the second signal leading wire 134 is connected to the control apparatus after extending from the bottom of the base 6. A fourth extension hole 612 facing outward the bottom plate 62 is disposed on a round-ring sidewall 61. The second power transmission leading wire 124 extends from the fourth extension hole 612 and extends from an edge of the bottom plate 62, and extends below the bottom of the base 6, and the second power transmission leading wire 124 is connected to an external power supply after extending out. In a possible implementation, the second power transmission leading wire 124 and the second signal leading wire 134 may be connected to wiring terminals disposed on the bottom of the base 6, and the power supply and the control apparatus are connected to wires having mating terminals. The second power transmission leading wire 124 can be connected to the power supply, and the second signal leading wire 134 can be connected to the control apparatus in a manner in which the wiring terminals are plugged to and matched with the mating terminals. In addition, the wiring terminal and the mating terminal can be repeatedly assembled and disassembled and used. Such a design facilitates connection between the motor 4, and the power supply and the control apparatus, and facilitates assembly and disassembly, replacement, and maintenance.

Refer to FIG. 16. Several assembly feet 623 protruding outward are disposed at edge positions on the bottom plate 62, and are configured to mount and fasten the motor 4. A connection hole that fits with a threaded fastener is disposed on the assembly foot 623, and the bottom plate 62 is fixedly mounted on a vehicle body by using the threaded fastener passing through the connection hole.

Figure 17:
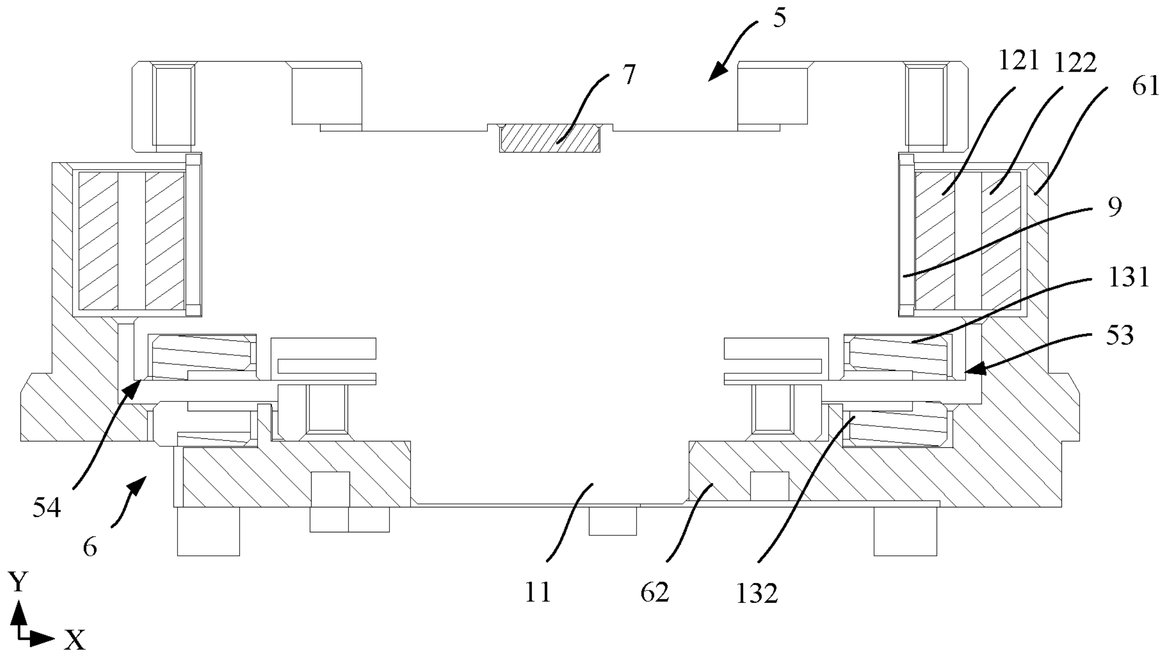
FIG. 17 is a sectional view of a base in FIG. 14.
Figure 18:
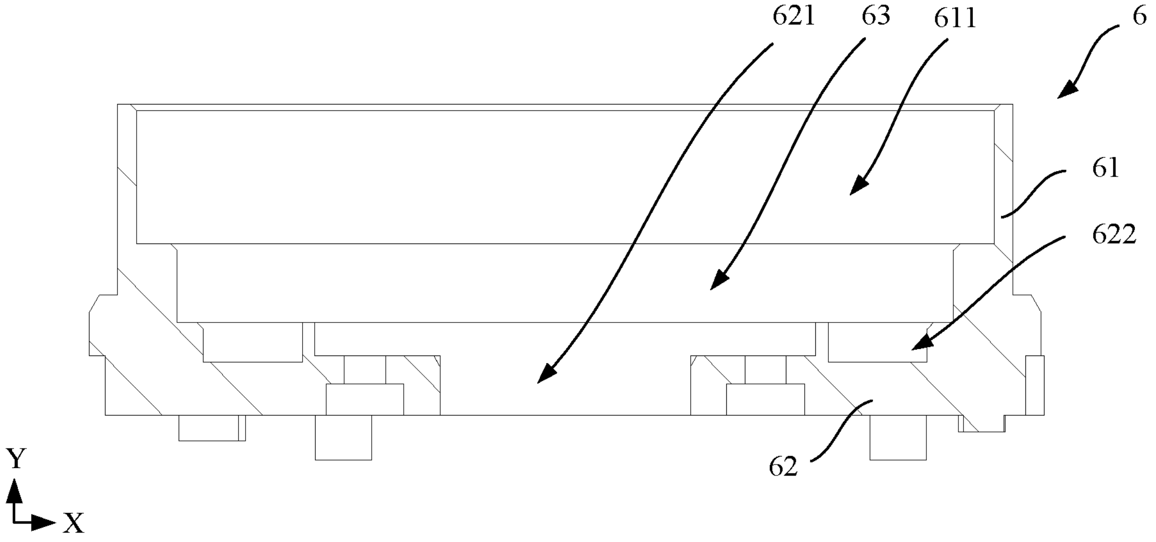
FIG. 18 is a sectional view of the motor in FIG. 14.

FIG. 17 is a sectional view of a base shown in FIG. 14, and FIG. 18 is a sectional view of the motor in FIG. 14. As shown in FIG. 17 and FIG. 18, a fourth mounting groove 622 disposed around the first axis is disposed on a surface that is of the bottom plate 62 and that faces the rotor 5, and the fourth mounting groove 622 is an annular groove around the first axis with an opening facing the rotor 5. If a plane that the first axis goes cross is used as a cutting plane, a cross-sectional shape of the fourth mounting groove 622 may be rectangular.

A second mounting groove 611 is disposed on an inner wall surface of the round-ring sidewall 61, the second mounting groove 611 is close to the top of the round-ring sidewall 61, and the second mounting groove 611 may extend around the first axis along the inner wall surface of the round-ring sidewall 61 to form an annular groove. In a possible implementation, an upper side surface of the second mounting groove 611 communicates with the top of the round-ring sidewall 61. If a plane that the first axis goes cross is used as a cutting plane, a cross-sectional shape of the second mounting groove 611 is an L shape.

Refer to FIG. 18. A first mounting groove 52 is disposed at a location that is opposite to the second mounting groove 611 and that is on an outer circumferential surface 53 of the rotor 5. The first mounting groove 52 may be an annular groove around the first axis. A center line of the annular groove coincides with the first axis. An opening of the first mounting groove 52 is in a horizontal direction and is away from the first axis. The first mounting groove 52 and the second mounting groove 611 are coaxially disposed.

A third mounting groove 55 is disposed at a location that is opposite to the fourth mounting groove 622 and that is on a bottom end surface 54 of the rotor 5. The third mounting groove 55 may be an annular groove around the first axis, an opening of the annular groove faces the fourth mounting groove 622. The third mounting groove 55 is and the fourth mounting groove 622 are coaxial, and the third mounting groove 55 is located right above the fourth mounting groove 622.

The power transmission inner ring 121 is mounted in the first mounting groove 52, and the power transmission inner magnetic ring is attached to a groove bottom surface of the first mounting groove 52. The power transmission outer ring is mounted in the second mounting groove 611, and the power transmission outer magnetic ring is attached to a vertical wall surface of the second mounting groove 611. A magnetic isolation part 9 is disposed between the power transmission inner ring 121 and the first mounting groove 52, configured to avoid interference to the power transmission assembly 12 that is from a magnetic field generated when the motor 4 operates. The magnetic isolation part 9 is a ring structure attached to the groove bottom surface of the first mounting groove 52, for example, may include two semicircular magnetic isolation tiles that are connected or spliced to each other. It can be learned from the foregoing description that central axes of the power transmission outer ring 122 and the power transmission inner ring 121 coincide with the first axis, and the power transmission outer ring 122 is sleeved on an outer side of the power transmission inner ring 121.

A power transmission principle of the power transmission assembly 12 is based on electromagnetic induction. The first coil and the second coil implement electric energy wireless transmission by using an electromagnetic field obtained through coupling as a medium. In a possible implementation, in the power transmission assembly 12, the power transmission inner magnetic ring and the power transmission outer magnetic ring may not be used, and only the first coil and the second coil are retained. In such a design, weight and a quantity of parts of the power transmission assembly 12 can be reduced, costs of the motor 4 using the power transmission assembly 12 are further reduced, and integration of the motor 4 using the power transmission assembly 12 is improved.

The signal inner ring 131 is disposed in the third mounting groove 55, and the signal inner magnetic ring is a ring structure attached to a groove bottom surface of the third mounting groove 55. The signal outer ring 132 is disposed in the fourth mounting groove 622, and the signal outer magnetic ring is a ring structure attached to a groove bottom surface of the fourth mounting groove 622. It can be learned from the foregoing description that central axes of the signal inner ring 131 and the signal outer ring 132 coincide with the first axis, and the signal inner ring 131 is located above the signal outer ring 132.

An operating principle of the motor 4 is as follows: The rotor 5 rotates around the first axis and on the stator 11, to drive the environment detection apparatus 3 to rotate. A power supply current of the external power supply enters the power transmission outer ring 122 through the second power transmission leading wire 124, and an operating signal of the control apparatus enters the signal outer ring 132 through the second signal leading wire 134. The power supply current and the operating signal are wirelessly transmitted to the power transmission inner ring 121 and the signal inner ring 131 respectively through magnetic coupling between coils of the power transmission outer ring 122 and the power transmission inner ring 121 and magnetic coupling between coils of the signal inner ring 131 and the signal outer ring 132. Then, the power transmission inner ring 121 transmits the operating current to the environment detection apparatus 3 mounted on the motor 4 through the first power transmission leading wire 123, and the signal inner ring 131 transmits the control signal to the environment detection apparatus 3 mounted on the motor 4 through the first signal leading wire 133.

It can be learned from the foregoing description that, in the motor 4 according to this embodiment, the power transmission inner ring 121 and the signal inner ring 131 are directly fastened on the rotor 5, and the power transmission outer ring 122 and the signal outer ring 132 are fastened on the base 6 that is coaxial with the stator 11. Such a design does not require the attachment plate, the fixed shaft, and the rotating body compared with the related technology, so that a structure of the motor 4 is simpler. This facilitates miniaturization of the motor 4, and further helps reduce an overall volume of a photoelectric scanning apparatus. In addition, a simple structure of the motor reduces a quantity of times of assembly in an assembly process of the motor, lowering an accumulated tolerance caused by a plurality of times of connection, and reducing a failure probability of magnetic coupling between coupled coils in the wireless transmission assembly.

In addition, a tolerance obtained after assembly between the stator 11 and the rotor 5 is far less than a maximum coupling tolerance allowed between the first coil 81 and the second coil 82 in the wireless transmission assembly 8. Therefore, in most cases, ensuring a tolerance between the base 6 and the stator 11 can meet a design requirement. It may be understood that a coaxiality tolerance between the base 6 and the stator 11 is easier to implement than a coaxiality tolerance between the fixed shaft 300 and the rotating body 200 in the related technology, reducing processing difficulty. In addition, the wireless transmission assembly is disposed on the assembled stator 11 and rotor 5, and the first leading wire and the second leading wire in the wireless transmission assembly can extend out without passing through a long fixed shaft, so that processing is simple. In addition, power transmission and signal transmission are completed by using assemblies independent of each other, so that transmission efficiency is higher and reliability is better.

It can be learned from the foregoing description that the power transmission assembly 12 is located on the outer circumferential surface 53 of the rotor 5 and the round-ring sidewall 61, and the signal transmission assembly 13 is located on the bottom end surface 54 of the rotor 5 and the bottom plate 62. The power transmission assembly 12 and the signal transmission assembly 13 are respectively disposed in different planes and are far away from each other. Therefore, interference between the power transmission assembly 12 and the signal transmission assembly 13 can be avoided. Apparently, disposition locations of the power transmission assembly 12 and the signal transmission assembly 13 may alternatively be exchanged.

In a possible implementation, both the power transmission inner ring 121 and the signal inner ring 141 are sleeved on the outer circumferential surface 53 of the rotor 5. Correspondingly, both the power transmission outer ring 122 and the signal outer ring 132 are mounted on the inner side surface of the round-ring sidewall 61. For example, a first mounting groove 52 and a third mounting groove 55 are disposed on the outer circumferential surface 53 of the rotor 5. The first mounting groove 52 and the third mounting groove 55 may be annular grooves around the first axis, and openings of both the first mounting groove 52 and the third mounting groove 55 are in horizontal directions and away from the first axis. On the round-ring sidewall 61, a second mounting groove 611 is disposed at a location corresponding to the first mounting groove 52, and a fourth mounting groove 622 is disposed at a location corresponding to the third mounting groove 55.

Optionally, both the power transmission inner ring 121 and the signal inner ring 131 may be disposed on the bottom end surface 54 of the rotor 5. Correspondingly, both the power transmission outer ring 122 and the signal outer ring 132 are mounted on the bottom plate 62 of the base 6. For example, a first mounting groove 52 and a third mounting groove 55 are disposed on the bottom end surface 54 of the rotor 5, and the first mounting groove 52 and the third mounting groove 55 may be annular grooves around the first axis. If a plane that the first axis goes cross is used as a cutting plane, a cross-sectional shape of the annular groove body is rectangular. Openings of both the first mounting groove 52 and the third mounting groove 55 are in vertical directions and face the bottom plate 62. On the bottom plate 62, a second mounting groove 611 is disposed at a location corresponding to the first mounting groove 52, and a fourth mounting groove 622 is disposed at a location corresponding to the third mounting groove 55.

It should be noted that the photoelectric scanning apparatus 2 provided in this embodiment is not limited to the field of autonomous vehicle technologies, and may be further applied to fields such as city monitoring.

In the descriptions of this specification, reference to descriptions of terms "one implementation", "some implementations", "example implementations", "example", "specific example", "some examples", or the like means specific features, structures, materials, or features described with reference to the implementations or examples are included in at least one implementation or example of this application. In this specification, the foregoing example expressions of the terms are not necessarily a same implementation or example. In addition, the described specific features, structures, materials, or features may be combined in a proper manner in any one or more of the implementations or examples.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A photoelectric scanning apparatus, comprising a motor, a wireless transmission assembly, and an environment detection apparatus, wherein:

the motor comprises a stator, a rotor, and a base, the stator is fixedly mounted on the base, and the rotor is sleeved on the stator;

the wireless transmission assembly comprises a first coil and a second coil, the first coil and the environment detection apparatus are both mounted on the rotor, the first coil is electrically connected to the environment detection apparatus, the second coil is mounted on the base, and the second coil is electrically connected to a control host; and at least one of wireless signal transmission or wireless power transmission is implemented between the control host and the environment detection apparatus through magnetic coupling between the first coil and the second coil;

wherein the base comprises a bottom plate and a round-ring sidewall disposed on the bottom plate, the round-ring sidewall and the stator are coaxial, and the stator and the rotor are located in a sidewall space enclosed by the round-ring sidewall; and wherein the first coil is mounted on an outer circumferential surface of the rotor, the second coil is mounted on an inner wall surface of the round-ring sidewall, and the second coil is sleeved on an outer side of the first coil coaxially.

2. The photoelectric scanning apparatus according to claim 1, wherein:

a first mounting groove is disposed on the outer circumferential surface of the rotor, and the first coil is mounted in the first mounting groove; or a second mounting groove is disposed on the inner wall surface of the round-ring sidewall, and the second coil is mounted in the second mounting groove.

3. The photoelectric scanning apparatus according to claim 1, wherein:

the wireless transmission assembly further comprises a third coil and a fourth coil, the third coil is mounted on the rotor, and the fourth coil is mounted on the base;

the wireless power transmission is implemented between the control host and the environment detection apparatus through magnetic coupling between the first coil and the second coil; and the wireless signal transmission is implemented between the control host and the environment detection apparatus through magnetic coupling between the third coil and the fourth coil.

4. The photoelectric scanning apparatus according to claim 3, wherein:

the first coil is disposed on an outer circumferential surface of the rotor, and the second coil is disposed on the base and is sleeved on an outer side of the first coil coaxially; and the third coil is disposed on a bottom end surface that is of the rotor and that faces the base, and the fourth coil is mounted on the base.

5. The photoelectric scanning apparatus according to claim 3, wherein:

both the first coil and the third coil are disposed on an outer circumferential surface of the rotor; and the second coil is disposed on the base and is sleeved on an outer side of the first coil coaxially, and the fourth coil is disposed on the base and is sleeved on an outer side of the third coil coaxially.

6. The photoelectric scanning apparatus according to claim 3, wherein both the first coil and the third coil are disposed on a bottom end surface that is of the rotor and that faces the base, and both the second coil and the fourth coil are mounted on the base.

7. The photoelectric scanning apparatus according to claim 3, wherein a magnetic isolation part is disposed between the first coil and the rotor.

8. The photoelectric scanning apparatus according to claim 3, wherein the wireless transmission assembly further comprises a signal inner magnetic ring and a signal outer magnetic ring, the third coil is wound around the signal inner magnetic ring, and the fourth coil is wound around the signal outer magnetic ring.

9. The photoelectric scanning apparatus according to claim 1, wherein a connection interface for mounting the environment detection apparatus is disposed at one end of the rotor, the connection interface comprises two mounting blocks symmetrically disposed relative to an axis of the rotor, and a mounting hole is disposed on each mounting block.

10. The photoelectric scanning apparatus according to claim 1, wherein the environment detection apparatus comprises a laser radar, an infrared radar, a millimeter-wave radar, or a camera.

11. A motor, configured to drive an environment detection apparatus, wherein:

the motor comprises a stator, a rotor, a base, and a wireless transmission assembly;

the stator is fixedly mounted on the base, the rotor is sleeved on the stator, the wireless transmission assembly comprises a first coil and a second coil, the first coil is mounted on the rotor, and the second coil is mounted on the base;

the environment detection apparatus is mounted on the rotor and is electrically connected to the first coil, and the second coil is electrically connected to a control host that controls the environment detection apparatus; and at least one of wireless signal transmission or wireless power transmission is implemented between the control host and the environment detection apparatus through magnetic coupling between the first coil and the second coil;

wherein the base comprises a bottom plate and a round-ring sidewall disposed on the bottom plate, the round-ring sidewall and the stator are coaxial, and the stator and the rotor are located in a sidewall space enclosed by the round-ring sidewall; and wherein the first coil is mounted on an outer circumferential surface of the rotor, the second coil is mounted on an inner wall surface of the round-ring sidewall, and the second coil is sleeved on an outer side of the first coil coaxially.

12. An autonomous vehicle, comprising a vehicle body and a photoelectric scanning apparatus, wherein the photoelectric scanning apparatus comprises:

a motor, a wireless transmission assembly, and an environment detection apparatus, wherein:

the motor comprises a stator, a rotor, and a base, the stator is fixedly mounted on the base, and the rotor is sleeved on the stator;

the wireless transmission assembly comprises a first coil and a second coil, the first coil and the environment detection apparatus are both mounted on the rotor, the first coil is electrically connected to the environment detection apparatus, the second coil is mounted on the base, and the second coil is electrically connected to a control host; and at least one of wireless signal transmission or wireless power transmission is implemented between the control host and the environment detection apparatus through magnetic coupling between the first coil and the second coil;

wherein the base comprises a bottom plate and a round-ring sidewall disposed on the bottom plate, the round-ring sidewall and the stator are coaxial, and the stator and the rotor are located in a sidewall space enclosed by the round-ring sidewall; and wherein the first coil is mounted on an outer circumferential surface of the rotor, the second coil is mounted on an inner wall surface of the round-ring sidewall, and the second coil is sleeved on an outer side of the first coil coaxially.

13. The autonomous vehicle according to claim 12, wherein:

a first mounting groove is disposed on the outer circumferential surface of the rotor, and the first coil is mounted in the first mounting groove; or a second mounting groove is disposed on the inner wall surface of the round-ring sidewall, and the second coil is mounted in the second mounting groove.

14. The autonomous vehicle according to claim 12, wherein:

the wireless transmission assembly further comprises a third coil and a fourth coil, the third coil is mounted on the rotor, and the fourth coil is mounted on the base;

the wireless power transmission is implemented between the control host and the environment detection apparatus through magnetic coupling between the first coil and the second coil; and the wireless signal transmission is implemented between the control host and the environment detection apparatus through magnetic coupling between the third coil and the fourth coil.

15. The autonomous vehicle according to claim 14, wherein:

the first coil is disposed on an outer circumferential surface of the rotor, and the second coil is disposed on the base and is sleeved on an outer side of the first coil coaxially; and the third coil is disposed on a bottom end surface that is of the rotor and that faces the base, and the fourth coil is mounted on the base.

16. The autonomous vehicle according to claim 14, wherein:

both the first coil and the third coil are disposed on an outer circumferential surface of the rotor; and the second coil is disposed on the base and is sleeved on an outer side of the first coil coaxially, and the fourth coil is disposed on the base and is sleeved on an outer side of the third coil coaxially.

17. The autonomous vehicle according to claim 14, wherein both the first coil and the third coil are disposed on a bottom end surface that is of the rotor and that faces the base, and both the second coil and the fourth coil are mounted on the base.

18. The autonomous vehicle according to claim 14, wherein a magnetic isolation part is disposed between the first coil and the rotor.

19. The autonomous vehicle according to claim 14, wherein the wireless transmission assembly further comprises a signal inner magnetic ring and a signal outer magnetic ring, the third coil is wound around the signal inner magnetic ring, and the fourth coil is wound around the signal outer magnetic ring.

* * * * *